2,890,193

POLYESTER RESINOUS COMPOSITIONS LIGHT-STABILIZED WITH A DIBENZOYL ALKYL PHENOL

William B. Hardy, Bound Brook, N.J., assignor to American Cyanamid Company, New York, N.Y., a corporation of Maine No Drawing. Application April 22, 1955
Serial No. 503,356

14 Claims. (Cl. 260—45.4)

The invention relates to light-stable resinous compositions and to the process of preparing the same. Still further, this invention relates to light stabilized resinous compositions such as unsaturated polyester resin compositions containing from about 0.01% to about 5% by weight of a compound having the general formula:

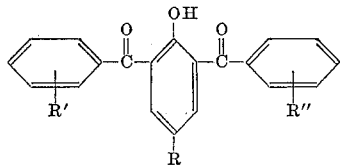

wherein R is an alkyl group containing from 1 to 10 carbon atoms, R' and R" are members selected from the group consisting of hydrogen, an alkyl group containing from 1 to 4 carbon atoms, alkoxy groups containing 1 to 4 carbon atoms, and a halogen atom.

One of the objects of the present invention is to stabilize resinous compositions such as unsaturated polyester resinous compositions from the deleterious effect of light and, more particularly, ultra-violet light by the incorporation therein of compounds having the general formula set forth hereinabove and described more fully in species hereinbelow. A further object of the present invention is to produce resinous compositions with markedly superior ultraviolet light absorption characteristics. These and other objects of the present invention will be discussed in greater detail hereinbelow.

Conventional polyester resins such as those prepared by reacting an alpha, beta unsaturated polycarboxylic acid with a dihydric aliphatic alcohol and said polyester being in admixture with a polymerizable compound containing a $CH_2=C<$ group are extremely useful as resinous compositions, particularly in the field of molding, casting and laminating. If these polyester materials are used with dark pigments, such as maroon, black and the like, the effect of sunlight or, more particularly, ultraviolet light on said molded or cast articles is virtually insignificant. However, if these polyester resinous compositions are used without benefit of any coloring material where clear articles are desired and if said cast or molded articles are to be subjected to the sun's rays, they tend to show oftentimes marked yellowing which, of course, renders such an article less desirable because of this color deterioration. I have discovered that by incorporating into these conventional polyester resins, a small amount of a compound having the following general formula:

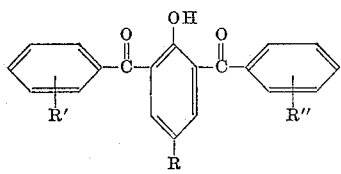

wherein R is an alkyl group containing from 1 to 10 carbon atoms, R' and R" are members selected from the group consisting of hydrogen, an alkyl group containing from 1 to 4 carbon atoms, alkoxy groups containing 1 to 4 carbon atoms, and a halogen atom, I am able to inhibit the tendency of the resinous material to yellow in a cured state when subjected to ultraviolet light.

In the preparation of the unsaturated polyester resins of the present invention, one should make use of the alpha, beta unsaturated polycarboxylic acids such as maleic, fumaric, aconitic, itaconic, monochloro maleic anhydride and the like. These unsaturated acids should be present in an amount approximating at least 20% by weight of the total weight of the polycarboxylic acids used and preferably in amounts varying between about 25% and 65% by weight based on the total weight of polycarboxylic acid present. If it is desired to make use of polycarboxylic acids which are free of non-benzenoid unsaturation, one could use such acids as phthalic, malonic, succinic, glutaric, sebacic and chlorinated polycarboxylic acids, such as tetrachlorophthalic anhydride, and the like but in amounts less than a larger proportion of the total amount of polycarboxylic acid present. Hexachloroendomethylene tetrahydrophthalic acid may be employed similarly. Whenever available the anhydrides of these acids may be used or mixture of the acids or mixtures of the anhydrides thereof.

As polyhydric alcohols which may be used to prepare the unsaturated polyesters of the present invention, it is preferred to make use of those alcohols having only two hydroxy groups although minor amounts of alcohols having three hydroxy groups, four hydroxy groups or more hydroxy groups may be used in minor amounts. As dihydroxy alcohols, one could use ethylene glycol, diethylene glycol, propylene glycol, dipropylene glycol, butanediol 1-4, butanediol 1-3, butanediol 1-2, pentanediol 1-2, pentanediol 1-3, pentanediol 1-4, pentanediol 1-5, hexanediol 1-6 and the like. Additionally, one could use glycerol, pentaerythritol, dipentaerythritol and the like.

The modifier for the polyester resin is a polymerizable material having a $CH_2=C<$ group. Amongst these polymerizable compounds are styrene, side chain substituted styrenes such as the alpha methylstyrene, alpha ethylstyrene and the like or ring substituted styrene such as ortho, meta and para-alkyl styrenes such as o-methylstyrene, p-ethylstyrene, meta-propylstyrene, 2,4-dimethylstyrene, 2,5-diethylstyrene, and the like. Still further, one can make use of the allyl compounds such as diallyl phthalate, allyl alcohol, methallyl alcohol, allyl acetate, allyl methacrylate, diallyl carbonate, allyl lactate, allyl alphahydroxyisobutyrate, allyl trichlorosilane, allyl acrylate, diallyl malonate, diallyl oxalate, allyl gluconate, allyl methylgluconate, diallyl adipate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl citrate, triallyl phosphate, trimethallyl phosphate, tetraallyl silane, tetraallyl silicate, hexallyl disiloxane, and the like.

In order that the present invention may be more completely understood, the following examples are set forth in which all parts are parts by weight. These examples are set forth primarily for the purpose of illustration and any specific enumeration of detail set forth therein should not be interpreted as limitations on the case except as indicated in the appended claims.

RESIN A

A polyester resin is prepared by coreacting 3 mols of phthalic anhydride, 3 mols of fumaric acid and 6.6 mols of propylene glycol. When esterification is substantially complete, as indicated by an acid number of about 30–40, there is added styrene in a sufficient amount to equal ½ of the polyester resin present and 0.02% by weight of ditertiary-butylhydroquinone based on the total weight of the unsaturated polyester and styrene, so that the ultimate composition contains 2 parts by weight of polyester resin per part by weight of monomeric styrene.

*Example 1*

To 200 parts of Resin A, there is added 2 parts of lauryl mercaptan as a 10% solution in styrene, 2 parts of methylethyl ketone peroxide and 0.25% by weight of 2,6-dibenzoyl-4-methylphenol. The resinous composition thus prepared was cast into a ⅛ inch sheet by pouring into a cell composed of two glass plates separated by a ⅛ inch gasket and held together with clamps. The resin filled glass plates are cured in an oven gradually by heating to 250° F. and holding for about three hours. The cured resin is removed from the cell and the samples are exposed to an S-1 sunlamp and in the weatherometer. The light reflectancy of the castings was determined before exposure and measured periodically during exposure. When a 10% loss in reflectancy is recorded at 430 millimicrons, the test is concluded and the exposure time to obtain the 10% loss in reflectancy is recorded.

*Example 2*

Example 1 is repeated in every detail except that in the place of the 0.25% of the 2,6-dibenzoyl-4-methylphenol, there is substituted 0.25% by weight of a commercially available ultraviolet absorber. A casting was made therefrom in the same manner as in Example 1.

*Example 3*

Example 1 is repeated in every detail except that there is added no ultraviolet light absorber. A casting was made therefrom and this casting was used as a control.

The following table gives the exposure time of the sample taken from Example 1, the sample of Example 2 and Example 3. These polyester resins are identified in the table as Resins 1, 2 and 3, respectively.

TABLE I

| Resin of Example | Exposure hours needed to obtain a 10% failure in reflectant light | |
|---|---|---|
| | Weatherometer | S-1 Sunlamp |
| 1 | 1,000 | 1,296 |
| 2 | 500–300 | 450–350 |
| 3 | 100–80 | 144–79 |

*Example 4*

Example 1 is repeated in every detail except in the place of the 2,6-dibenzoyl-4-methylphenol, there is substituted an equal amount of 2,6-dibenzoyl-4-ethylphenol. A panel prepared therefrom in the same manner as in Example 1 was exposed to the weatherometer and the S-1 sunlamp with comparable results.

*Example 5*

Example 1 is repeated in every detail except that in the place of 2,6-dibenzoyl-4-methylphenol, there is substituted an equivalent amount of 2,6-dibenzoyl-4-butylphenol. Tests on a panel produced therefrom in the weatherometer and under the S-1 sunlamp produced comparable results.

*Example 6*

100 parts of polyvinyl chloride, 50 parts of di-2-ethyl hexyl phthalate and 2 parts of 2,6-dibenzoyl-4-methylphenol are blended together and fluxed on hot mill rolls at a temperature of about 130–150° C. for about 10–15 minutes. The resulting plasticized sheet was subjected to tests under the Fadometer. The first yellowing was observed after 638 hours. The test was continued for 1320 hours at which time the test was discontinued as the sheet had yellowed very markedly.

*Example 7*

Example 6 is repeated in every detail except in the place of the 2,6-dibenzoyl-4-methylphenol, there is substituted an equal amount of a commercially available ultraviolet absorber. The first spot under the Fadometer appeared in less than 100 hours and the test was stopped because of marked yellowing after 154 hours.

*Example 8*

Example 6 is repeated in every detail except that there is no ultraviolet light absorber added. The first spot appeared in less than 50 hours and the test was stopped after 88 hours because of the marked deterioration of the color of the sheet.

*Example 9*

100 parts of polyvinyl chloride, 50 parts of di-2-ethyl hexyl phthalate, 4 parts of a heat stabilizer comprising a mixture of cadmium soaps of ricinoleic acid and hexanoic acid and 0.1 part of 2,6-dibenzoyl-4-methylphenol are blended and fluxed on hot mill rolls for about 20 minutes at a mill temperature of about 130° C. In testing the plasticized sheet in the Fadometer, the first spot appeared in 132 hours, whereas the test was run for 528 hours before the sheet had deteriorated sufficiently to become substandard.

*Example 10*

Example 9 is repeated in every detail except in the place of the 2,6-dibenzoyl-4-methylphenol, there is substituted an equal amount of a commercially available ultraviolet light absorber. When subjected to the Fadometer, the test was discontinued after 418 hours because the sheet had deteriorated sufficiently to become substandard.

*Example 11*

Example 9 is repeated in every detail except that there is no ultraviolet light absorber added to the sheet. When subjected to the Fadometer, the test had to be stopped at 308 hours because the sheet had deteriorated sufficiently to become substandard.

*Example 12*

Example 9 is repeated in every detail except that in the place of the 2,6-dibenzoyl-4-methylphenol, there is substituted an equal amount of 2,6-dibenzoyl-4-ethylphenol. The results of the Fadometer test were substantially the same as those realized in testing the sheet of Example 9.

In the Examples 9–12, inclusive, use was made of a heat stabilizer. These heat stabilizers are metallic soaps of fatty acids such as the metallic soaps of caproic, caprylic, lauric, myristic, palmitic, stearic, myristoleic, palmitoleic, oleic, linoleic, linolenic, elaestearic, ricinoleic acids and the like. Oftentimes, these metallic soaps are used in combination with one another. The metallic portion of the soap may be such metals as cadmium, lead, strontium, tin, barium and the like. The amount of heat stabilizer utilized is conventional and is well known in the art.

In order that the method for the preparation of these dibenzoyl alkyl phenols may be completely understood, the following example is set forth in which all parts are parts by weight, unless otherwise indicated.

PREPARATION OF 2,6-DIBENZOYL-4-METHYLPHENOL

Into a suitable reaction chamber equipped with thermometer and stirrer, there is introduced 15 parts of aluminum chloride and 120 parts of nitrobenzene. The charge is thoroughly mixed and while cooling, there is added 10.6 parts of 2-hydroxy-5-methyl-benzophenone. The cooling of the charge is discontinued permitting the temperature to return to room temperature, whereupon 9.75 parts of benzotrichloride are added and the mixture is then heated to about 70° C. and held at about that temperature for a 2 hour period. The reaction mixture is a purplish-black color. It is poured onto ice and allowed to stand overnight. The nitrobenzene remaining is removed by steam distillation. The aqueous layer is removed leaving a red tar residue which is dispersed in 400 parts of boiling 95% ethanol. The solution is treated with activated charcoal and filtered hot. On cooling, a fine yellow solid precipitates which is removed by filtration and is dried. 7.9 parts of the material is obtained. The product has a melting point of 160.2 to 163.2° C. The product is purified by recrystallization from a mixture of 80 parts of 95% ethanol and 62 parts of the product giving 6.1 parts of a material with a melting point of 164.2 to 165.6° C.

*Analysis.*—Calculated for $C_{21}H_{16}O_3$: C, 79.73; H, 5.10. Found: C, 79.58; H, 5.34.

Amongst the dibenzoyl alkyl phenols which may be used as ultraviolet light absorbers in keeping with the present invention are 2,6-dibenzoyl-4-methylphenol; 2,6-dibenzoyl-4-ethylphenol; 2,6-dibenzoyl-4 - propylphenol; 2,6-dibenzoyl-4-butylphenol; 2,6-dibenzoyl-4 - hexylphenol; 2,6-dibenzoyl-4-octylphenol; 2,6-dibenzoyl-4-decylphenol; 2,6-bis(p-methoxybenzoyl)-4-methylphenol; 2,6-bis(p-propoxybenzoyl)-4-methylphenol; 2,6 - bis(p - butoxybenzoyl)-4-methylphenol; 2,6-bis(p-butoxybenzoyl)-4-amylphenol; 2,6-bis(p-butoxybenzoyl)-4-nonylphenol; 2,6-bis(o-methylbenzoyl)-4-methylphenol; 2,6-bis(o-butylbenzoyl)-4-methylphenol; 2,6-bis(o-butylbenzoyl) - 4- ethylphenol; 2,6-bis(m-chlorobenzoyl)-4 - methylphenol; 2,6-bis(m-bromobenzoyl)-4-methylphenol and the like. In addition to the chloro, and bromo substituted benzoyl alkyl phenols, one may readily utilize the iodo and fluoro substituted benzoyl alkyl phenols. The amount of these dibenzoyl alkyl phenols which may be used in the resinous compositions of the present invention may vary between about 0.01 and 5% by weight based on the total weight of the resin solids, actual or potential, whichever is greater. Preferably, one may use between about 0.1 and 1.0% by weight of these compounds based on the total weight of the resin solids.

In the preparation of the unsaturated polyester, used in the present invention, one could use the polyhydric alcohols and polycarboxylic acids in a proportion substantially equalling about mol per mol and preferably an excess of alcohol approximating 10% above the stoichiometrical quantity required for complete esterification. When polyhydric alcohols having more than 2 hydroxy groups are used, calculations should be made on a stoichiometrical basis so as to make allowance for the additional hydroxy groups, such as those found in glycerol, pentaerythritol, dipentaerythritol and the like. This is equally true when polycarboxylic acids having greater than 2 carboxyl groups are used. The important thing to remember is that on a stoichiometrical basis, a sufficient quantity of the alcohol and acid should be reacted so as to give an ultimate unsaturated polyester resinous material having an acid number not significantly greater than 100 and preferably not significantly greater than 50. For optimum results, the polyester resinous materials should be reacted in adequate quantities of alcohol and acid so as to give a polyester resin having an acid number not significantly greater than 30–40.

In the preparation of the polymerizable polyester compositions of the present invention, one could use between about 20 parts by weight of the monomeric compound containing the polymerizable $CH_2=C<$ group to 80 parts of the unsaturated polyester resin up to 80 parts of the monomer compound containing a polymerizable $CH_2=C<$ group to 20 parts of the unsaturated polyester resin. As a preferred embodiment, however, it is desired to use about 33 parts of the monomeric polymerizable compound containing the $CH_2=C<$ group to each 67 parts of the unsaturated polyester resinous material.

The compositions containing the unsaturated polyester resin and the compound containing the polymerizable $CH_2=C<$ group are disclosed in a plurality of U.S. Patents, such as 2,443,735–41, inclusive, amongst others.

In the formulation of the polyester resinous compositions of the present invention, it is imperative to use a catalyst of the peroxide class of which a great plurality are set forth in those U.S. patents mentioned hereinabove. The amount of catalyst may vary very appreciably from about 0.1–10% by weight based on the total weight of the polymerizable composition. Preferably, one would use between about 0.5 and about 1% by weight of these catalysts, based on the total weight of the polymerizable resinous composition.

If it is desired to effect low temperature cure of the unsaturated polyester resinous composition, it will be desirable to make use of a material commonly referred to as a promoter. These promoters, such as mercaptans, the alkyl substituted anilines and the metallic salt driers, e.g., cobalt naphthenate, are generally dispersed in a solution of a suitable solvent material, such as the monomeric polymerizable material. If high temperature cure is to be accomplished, a promoter is not necessary. Promoters which are useful in this connection have been disclosed in prior art as represented by such patents as U.S. 2,466,800 and 2,480,928.

I claim:

1. A resinous composition comprising a copolymerizable mixture of from about 20 to 80 parts of (1) an unsaturated polyester resin of an alpha, beta ethylenically unsaturated polycarboxylic acid and a polyhydric alcohol having an acid number less than 100, correspondingly from about 80 to 20 parts of (2) a compound containing a polymerizable $CH_2=C<$ group, (3) a polymerization catalyst for (1) and (2), and (4) 0.01%–5% by weight of a compound having the general formula:

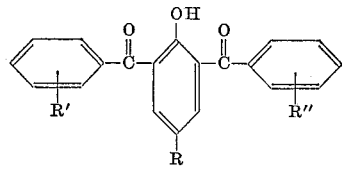

wherein R is an alkyl group containing from 1 to 10 carbon atoms, R' and R" are members selected from the group consisting of hydrogen, an alkyl group containing from 1 to 4 carbon atoms, alkoxy groups containing 1 to 4 carbon atoms, and a halogen atom.

2. A light-stable, infusible and insoluble product of polymerization of the resinous composition according to claim 1.

3. A resinous composition comprising a copolymerizable mixture of from about 20 to 80 parts of (1) an unsaturated polyester resin of an alpha, beta ethylenically unsaturated polycarboxylic acid and a polyhydric alcohol having an acid number less than 100, correspondingly from about 80 to 20 parts of (2) a compound containing a polymerizable $CH_2=C<$ group, (3) a polymerization catalyst for (1) and (2), and (4) 0.01%–5% by weight of 2,6-dibenzoyl-4-methylphenol.

4. A resinous composition comprising a copolymerizable mixture of from about 20 to 80 parts of (1) an unsaturated polyester resin of an alpha, beta ethylenically unsaturated polycarboxylic acid and a polyhydric alcohol having an acid number less than 100, correspondingly from about 80 to 20 parts of (2) a compound containing a polymerizable $CH_2=C<$ group, (3) a polymerization catalyst for (1) and (2), and (4) 0.01%–5% by weight of 2,6-dibenzoyl-4-ethylphenol.

5. A resinous composition comprising a copolymerizable mixture of from about 20 to 80 parts of (1) an unsaturated polyester resin of an alpha, beta ethylenically unsaturated polycarboxylic acid and a polyhydric alcohol having an acid number less than 100, correspondingly from about 80 to 20 parts of (2) a compound containing a polymerizable CH₂=C< group, (3) a polymerization catalyst for (1) and (2), and (4) 0.01%–5% by weight of 2,6-dibenzoyl-4-propylphenol.

6. A resinous composition comprising a copolymerizable mixture of from about 20 to 80 parts of (1) an unsaturated polyester resin of an alpha, beta ethylenically unsaturated polycarboxylic acid and a polyhydric alcohol having an acid number less than 100, correspondingly from about 80 to 20 parts of (2) a compound containing a polymerizable CH₂=C< group, (3) a polymerization catalyst for (1) and (2), and (4) 0.01%–5% by weight of 2,6-dibenzoyl-4-butylphenol.

7. A resinous composition comprising a copolymerizable mixture of from about 20 to 80 parts of (1) an unsaturated polyester resin of an alpha, beta ethylenically unsaturated polycarboxylic acid and a polyhydric alcohol having an acid number less than 100, correspondingly from about 80 to 20 parts of (2) styrene, (3) a polymerization catalyst for (1) and (2), and (4) 0.01%–5% by weight of a compound having the general formula:

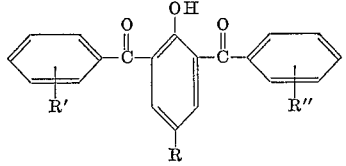

wherein R is an alkyl group containing from 1 to 10 carbon atoms, R' and R" are members selected from the group consisting of hydrogen, an alkyl group containing from 1 to 4 carbon atoms, alkoxy groups containing 1 to 4 carbon atoms, and a halogen atom.

8. A light-stable, infusible and insoluble product of polymerization of the resinous composition according to claim 7.

9. A resinous composition comprising a copolymerizable mixture of from about 20 to 80 parts of (1) an unsaturated polyester resin of an alpha, beta ethylenically unsaturated polycarboxylic acid and a polyhydric alcohol having an acid number less than 100, correspondingly from about 80 to 20 parts of (2) styrene, (3) a polymerization catalyst for (1) and (2), and (4) 0.01%–5% by weight of 2,6-dibenzoyl-4-methylphenol.

10. A light-stable, infusible and insoluble product of polymerization of the resinous composition according to claim 9.

11. A resinous composition comprising a copolymerizable mixture of from about 20 to 80 parts of (1) an unsaturated polyester resin of an alpha, beta ethylenically unsaturated polycarboxylic acid and a polyhydric alcohol having an acid number less than 100, correspondingly from about 80 to 20 parts of (2) diallyl phthalate, (3) a polymerization catalyst for (1) and (2), and (4) 0.01%–5% by weight of a compound having the general formula:

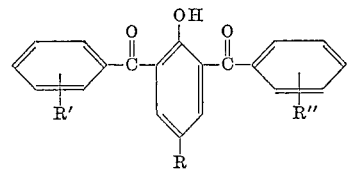

wherein R is an alkyl group containing from 1 to 10 carbon atoms, R' and R" are members selected from the group consisting of hydrogen, an alkyl group containing from 1 to 4 carbon atoms, alkoxy groups containing 1 to 4 carbon atoms, and a halogen atom.

12. A light-stable, infusible and insoluble product of polymerization of the resinous composition according to claim 11.

13. A resinous composition comprising a copolymerizable mixture of from about 20 to 80 parts of (1) an unsaturated polyester resin of an alpha, beta ethylenically unsaturated polycarboxylic acid and a polyhydric alcohol having an acid number less than 100, correspondingly from about 80 to 20 parts of (2) diallyl phthalate, (3) a polymerization catalyst for (1) and (2), and (4) 0.01%–5% by weight of 2,6-dibenzoyl-4-methylphenol.

14. A light-stable, infusible and insoluble product of polymerization of the resinous composition according to claim 13.

No references cited.